July 17, 1951 H. J. KUHLMAN 2,560,801
ENDLESS CHAIN GATHERER FOR CORN PICKERS
Filed Sept. 10, 1947 7 Sheets-Sheet 3
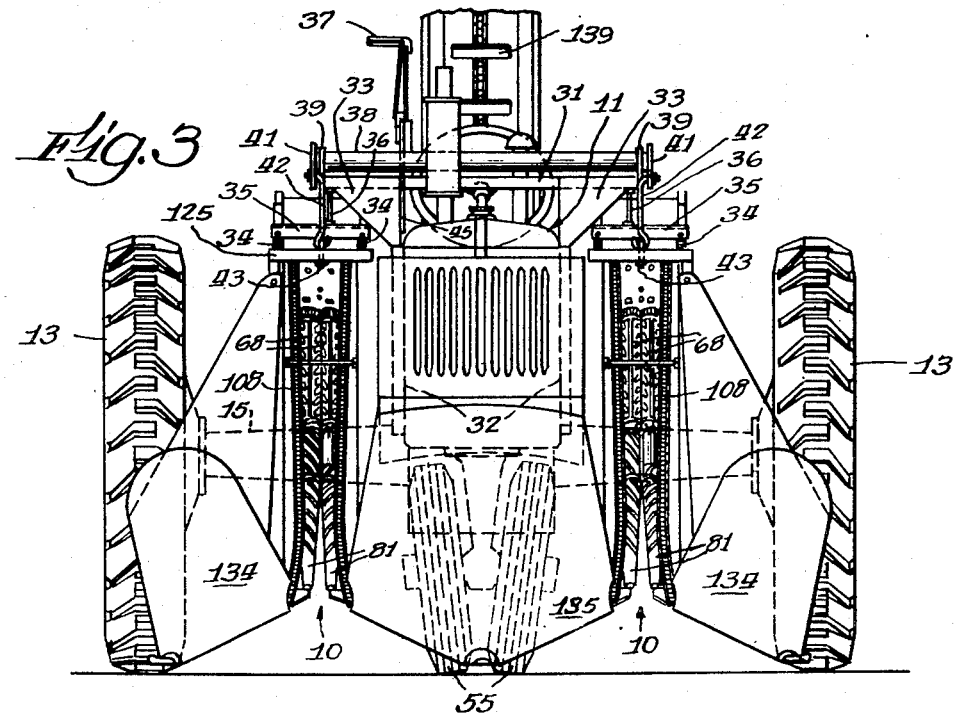
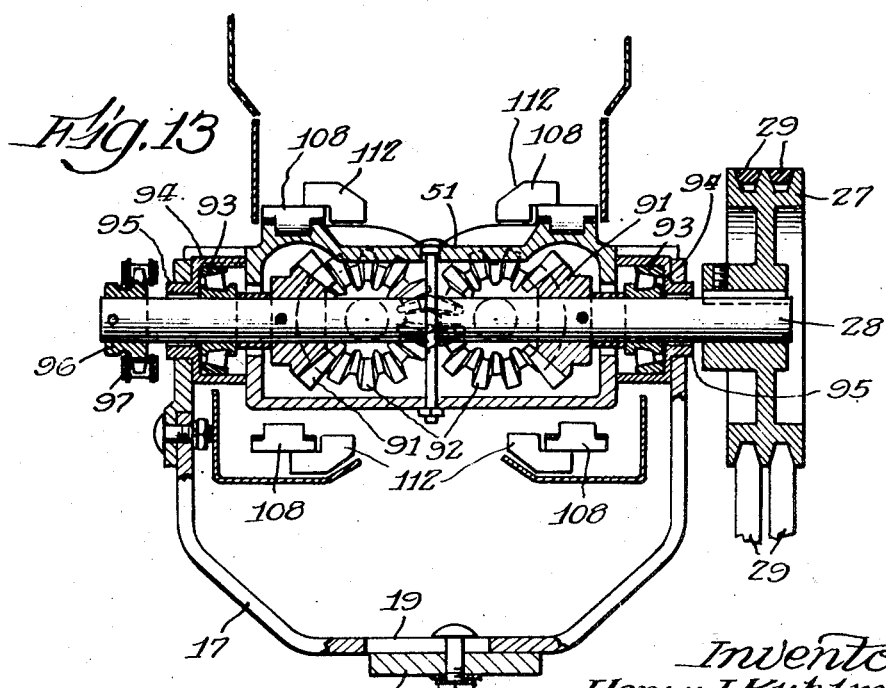
Inventor:
Henry J. Kuhlman
By Clarence J. Loftus atty July 17, 1951 H. J. KUHLMAN 2,560,801
ENDLESS CHAIN GATHERER FOR CORN PICKERS
Filed Sept. 10, 1947 7 Sheets-Sheet 4
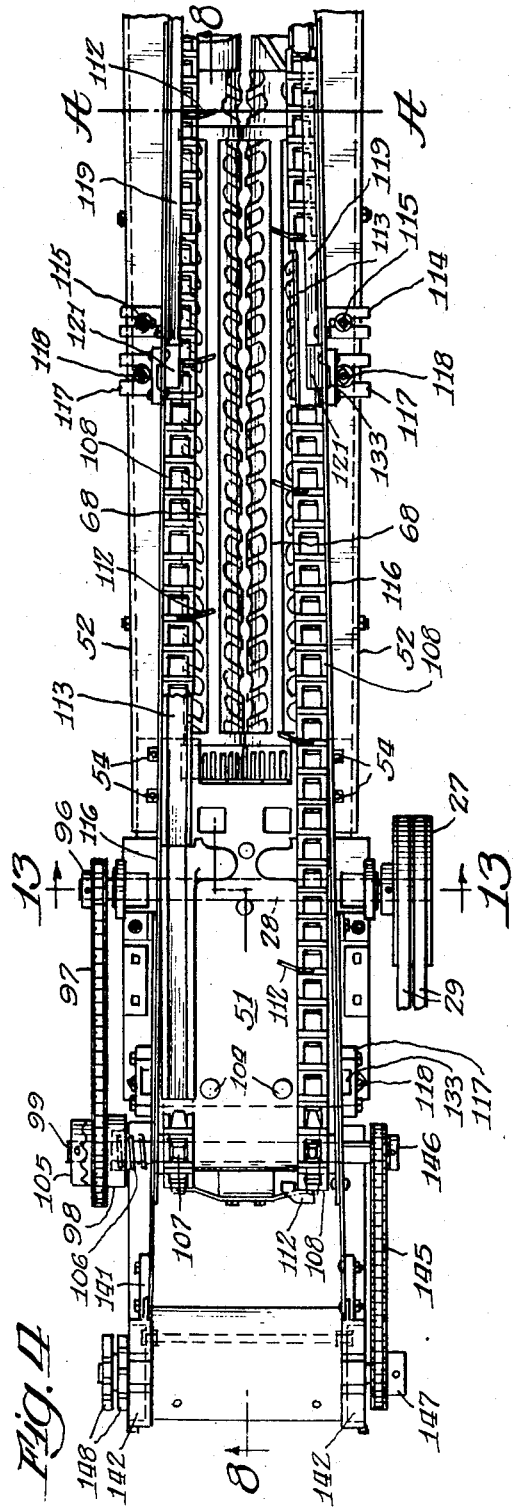
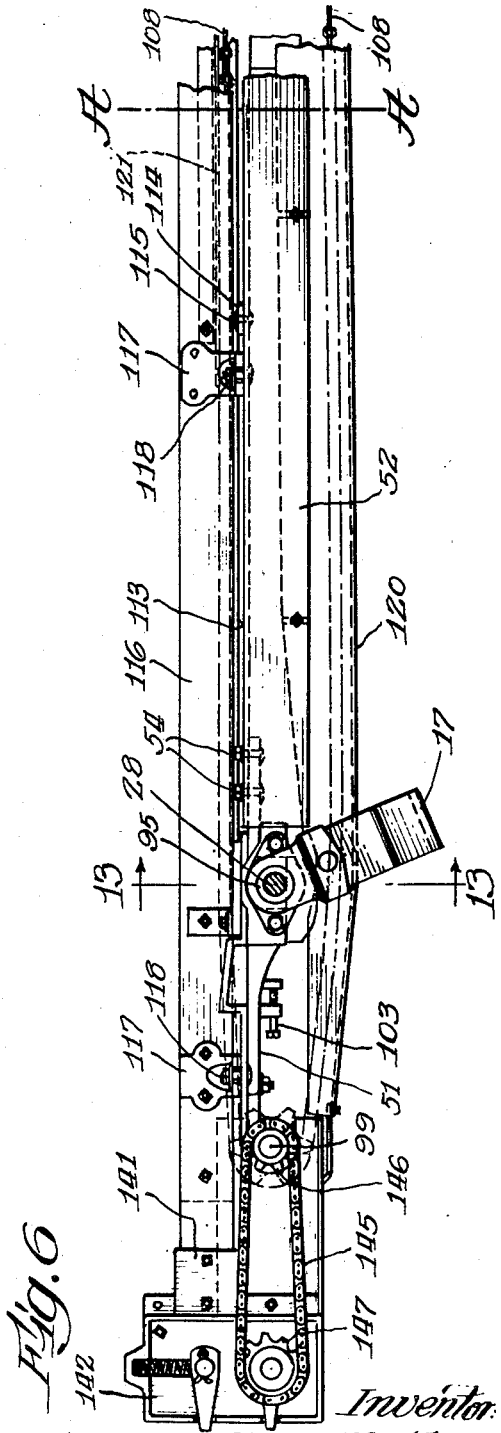
Inventor
Henry J. Kuhlman
By Clarence J. Loftus Atty.

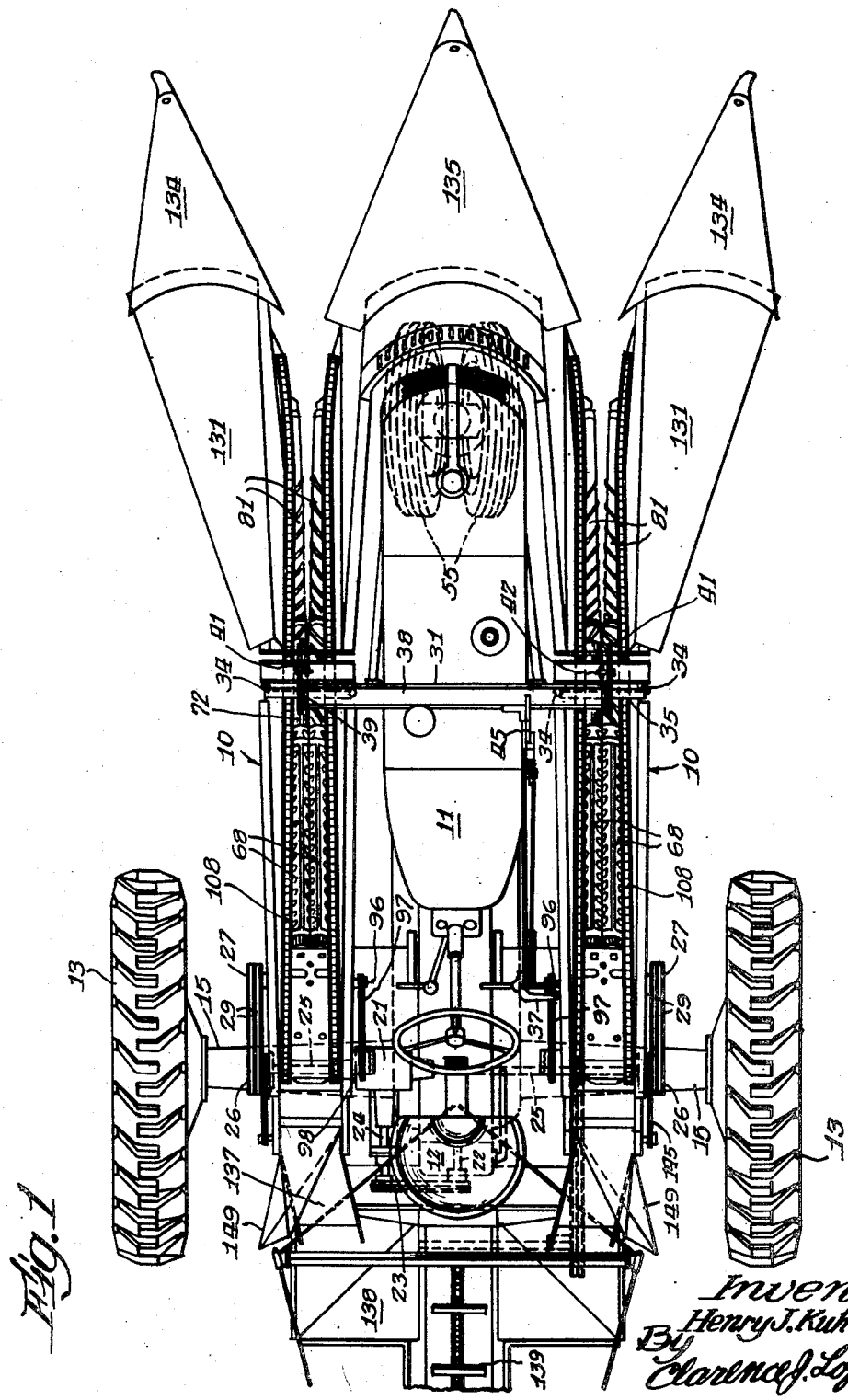

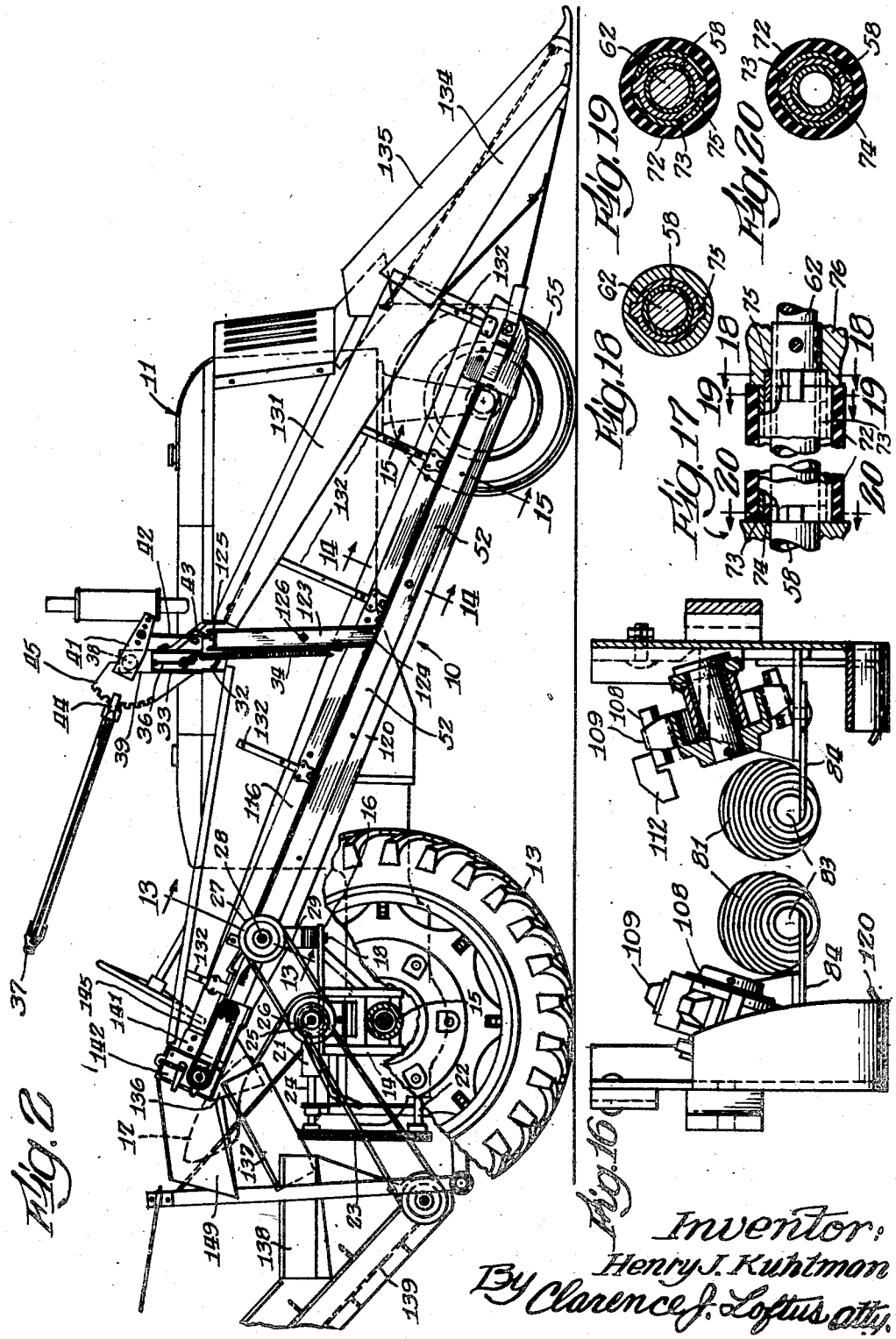

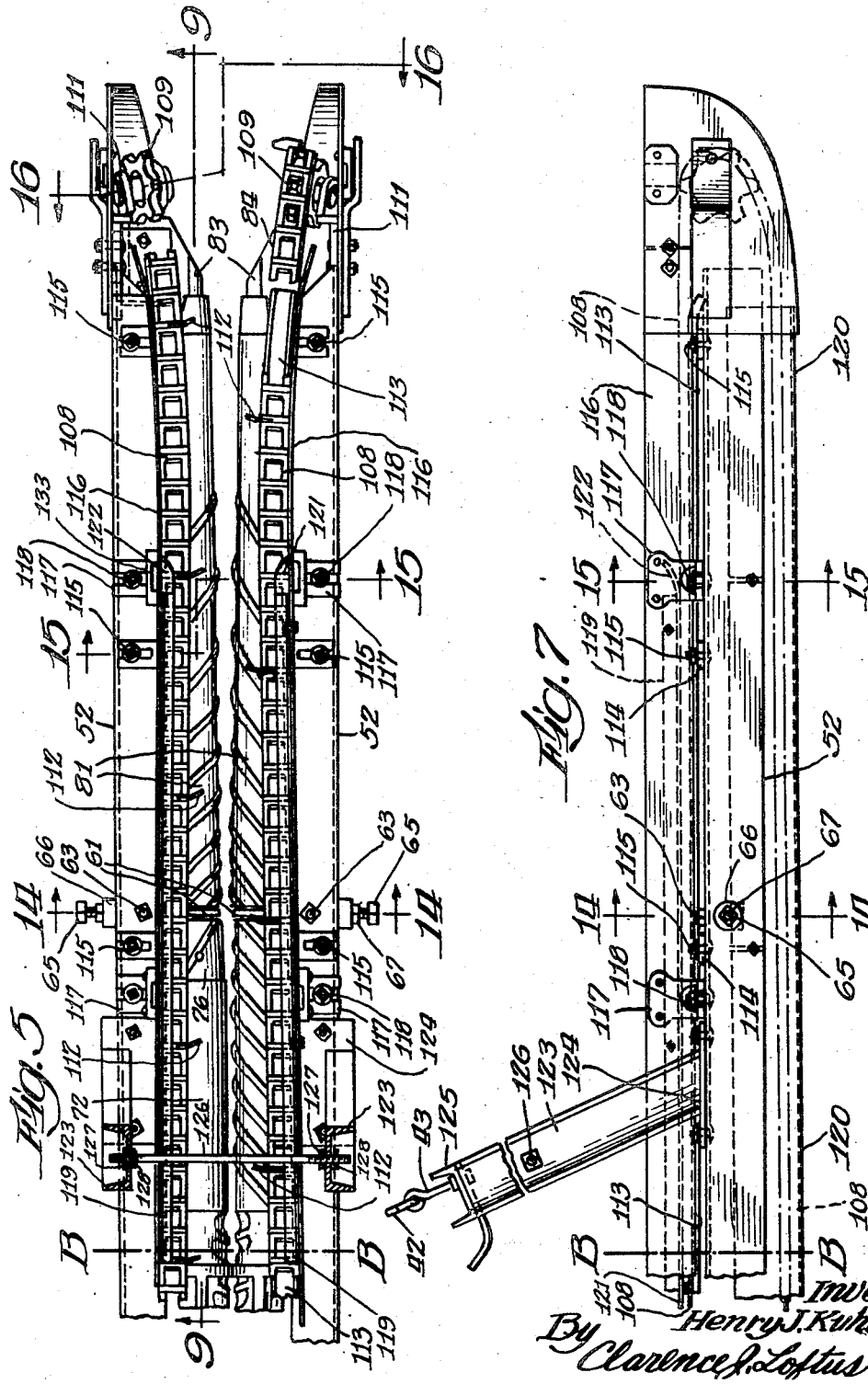

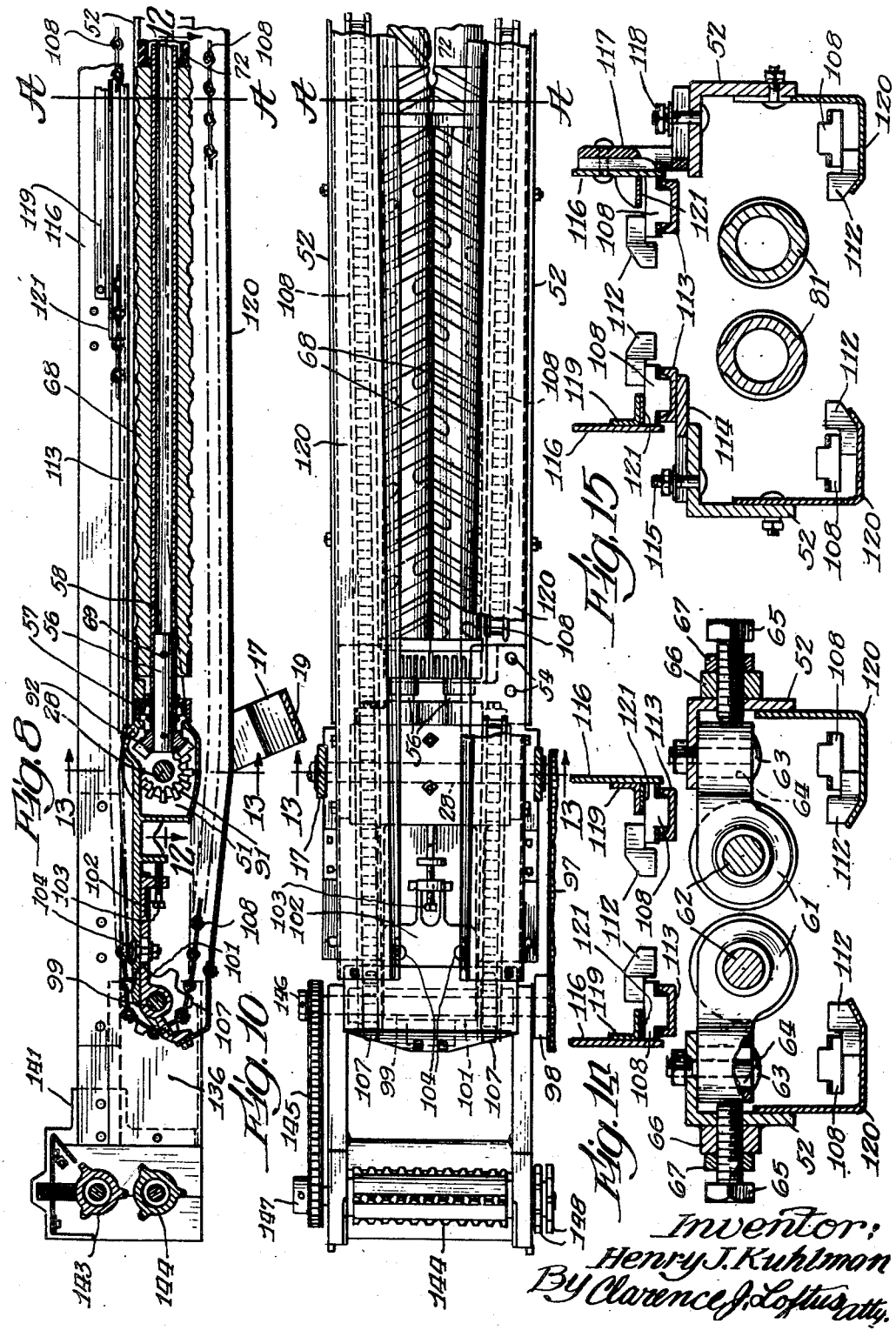

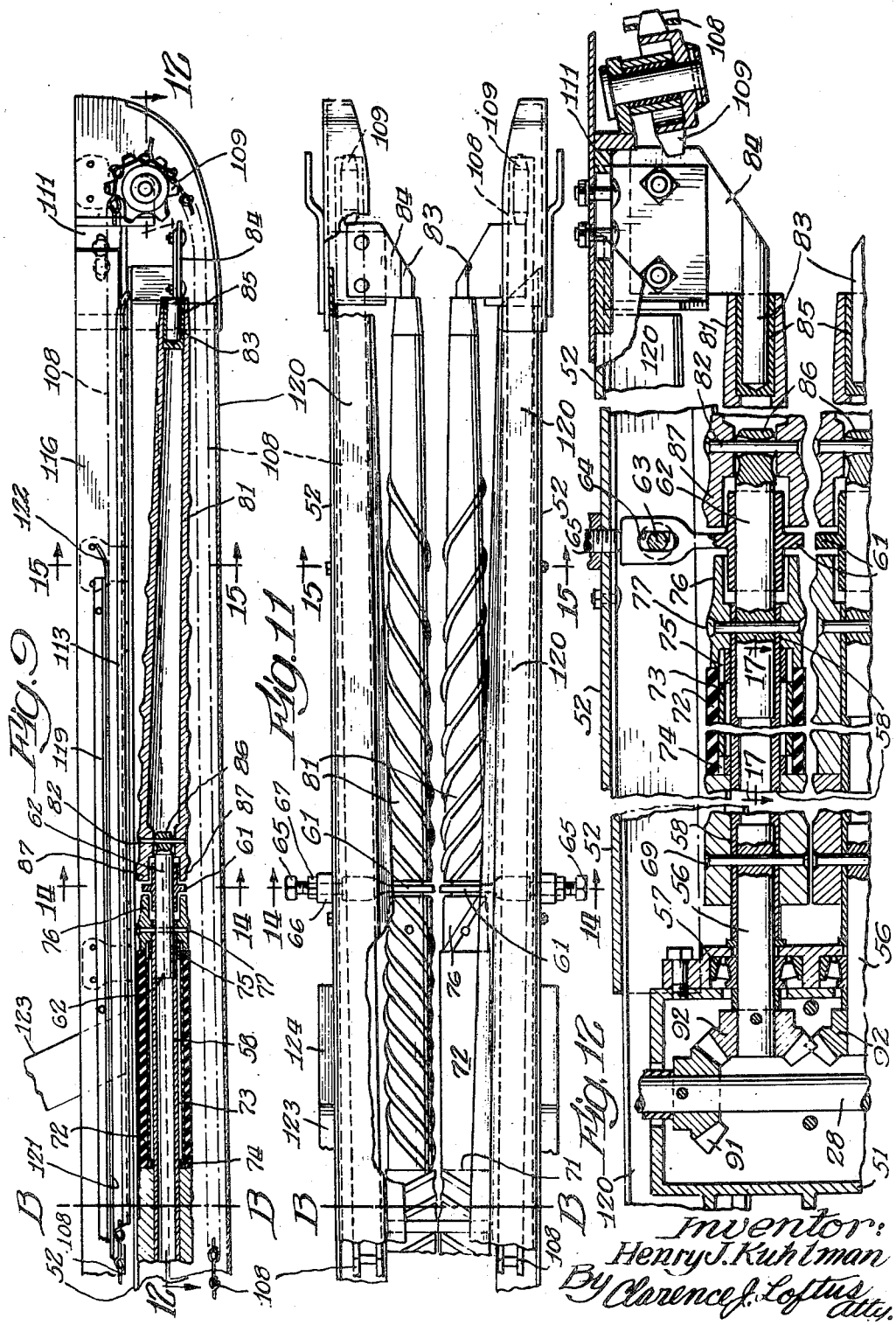

Patented July 17, 1951

2,560,801

UNITED STATES PATENT OFFICE 2,560,801

ENDLESS CHAIN GATHERER FOR CORN PICKERS

Henry J. Kuhlman, Waterloo, Iowa, assignor to Kuhlman Manufacturing Company, Waterloo, Iowa, a corporation of Iowa Application September 10, 1947, Serial No. 773,227

7 Claims. (Cl. 56—18)

The present invention relates to corn harvesters. It is the general aim of the invention to provide a novel and improved harvester that is more simple in construction, lighter in weight, and more easily attached, adjusted and operated than previously known machines, yet so designed that it is unusually efficient in operation and consequently generally superior to prior devices of the kind.

The applicant is aware that the corn harvesting art is an old one, and is crowded with various examples of machines utilizing the same general principles to pick the ears of corn from the stalks and remove the husks. It is believed, however, that the very voluminousness of the art is indicative of the fact that, although the problems involved in the operation have long been recognized, none of the devices heretofore designed has offered a thoroughly acceptable solution.

Most of the prior harvesters known to the applicant have been quite complex machines, usually including a multiplicity of chains and rollers, and often involving snapping rolls and husking rolls separately mounted and separately driven, together with gathering chains for the snapping rolls and separate conveyor chains to carry the corn to the husking rolls. Obviously these elaborate arrangements have been extremely heavy, with the result that if they are attached to an ordinary tractor they tend to overload it to the extent that it is difficult to operate on soft ground. In addition, prior mechanisms have ordinarily been so bulky that if one of the units is attached to each side of a tractor to provide a double row machine, the mechanism so limits the movement of the front wheel of the tractor that normal steering is not possible.

It is accordingly submitted that the teachings of this disclosure mark a true forward step in the art, since they accomplish the desired high degree of efficiency without unnecessary weight, with a minimum of mechanical complexities, and with the several parts of the device so designed and related that the harvesting mechanism may be easily attached to or detached from a conventional type of farm tractor, and may be used without interfering with the steering mechanism or other normal operations of the tractor.

It is, therefore, one of the primary objects of the present invention to provide a corn picking and husking unit wherein the parts are so formed and mounted that the units are not as wide as heretofore required. This reduction in width means that when one unit is mounted on each side of a conventional tractor to provide a double row machine, the units may be adjusted to a spacing equal to the precise distance between the rows, yet the harvester will operate without interfering with the steering movement of the front wheel of the tractor even in the narrowest rows.

Another important object of the invention resides in the provision of a harvesting unit adapted to be mounted on the side of a tractor wherein each unit includes a frame with a single pair of articulated rolls in a forwardly sloping position; the rolls having a snapping section at the lower end to remove the ears of corn from the stalk, and a husking section above the snapping section; together with a corn chute above the upper end of the rolls, and a pair of trash rolls beyond the chute and at right angles to the harvesting rolls, so that the trash rolls will pick up and eject any foreign material or pieces of corn stalk that might otherwise fall into the corn chute or clog the machine.

Another important object of the invention resides in the provision of a husking unit including a frame adapted to be secured in a forwardly sloping position on the side of a tractor, together with a single pair of harvesting rolls extending longitudinally of the frame and a single pair of chains extending substantially the length of the harvesting rolls, yet arranged to include a closely spaced gathering portion adjacent the lower end of the rolls, and a more widely spaced conveyor portion adjacent the upper portion of the rolls.

A still further object of the invention resides in the provision of a pair of gathering or conveyor chains for harvester rolls wherein the return span of the chain passes substantially below the operating span rather than at the sides, so that the frame of the device may be narrower than in prior types. This relationship of parts also means that the extreme forward end of the chain moves in an upward, rather than a horizontal direction, with the result that the chain is more effective in lifting broken stalks and directing them into the rolls.

Another object resides in the provision of a harvesting unit including articulated rolls and gathering or conveyor chains as indicated above, together with improved and simplified means for adjusting the relative positions of the several parts to suit the machine to the nature of the crop to be harvested.

These objects are accomplished and the shortcomings of prior machines are overcome by the construction and arrangement of parts here shown, which achieves efficient picking and husking of the corn by a relatively simple arrangement having one or more harvesting units, each including a forwardly sloping frame with only a single pair of rolls, wherein the rolls are arranged in articulated sections so that the single pair of rolls successfully accomplishes both the picking and husking functions. The operation of the rolls is further facilitated by a single pair of dual purpose chains, so disposed as to move quite close together at the lower end of the rolls to function as gathering chains at that point and effect a fairly positive grasp on the stalks of corn as they enter the rolls, yet arranged to gradually move apart as the chain progresses upwardly over the husking portion of the rolls so that the upper portion of the chain acts only as an auxiliary conveyor and permits the ears to remain on the husking rolls as long as necessary to complete the husking operation. The return spans of the chains are positioned below the operating spans rather than at the sides, with the result that the unit is narrow enough that even when spaced for closely planted fields they will clear the front wheel of the tractor to permit unrestricted turning of the tractor. This arrangement of the chains also facilitates harvesting ears from broken or down stalks, since the extreme forward end of each of the chains is moving around the sprocket in an upwardly direction, and the fingers attached to the chain will lift any broken stalks and direct them into the rolls. It may thus be said that the present machine affects a happy reconciliation between the need for an efficient gathering, snapping and husking mechanism and the desire for a mechanism that is sufficiently simple in construction, compact in size and light in weight that a pair of the units may be carried on an ordinary tractor without overloading the machine or interfering with the steering, and so that the units may be easily and quickly attached and detached as required.

In the drawings attached to and forming a part of the present specification:

Figure 1 is a plan view of a double row corn harvester constructed in accordance with the teachings of this invention, the harvester being shown in operating position on a conventional tractor.

Figure 2 is a side elevational view thereof, partly broken away to show the mounting and driving means for the harvester.

Figure 3 is a front elevational view of the harvester shown in Figures 1 and 2.

Figures 4 and 5 together comprise a plan view of one of the harvester units with the shields removed to show the frame; Figure 4 being the upper portion of the unit and Figure 5 the lower portion thereof, with the two figures matching each other on the lines A—A and B—B respectively.

Figures 6 and 7 together comprise a side elevational view of one of the harvester frames; Figure 6 being the upper end and Figure 7 the lower end thereof, with the two figures matching on the lines A—A and B—B.

Figures 8 and 9 comprise a longitudinal sectional view through one of the harvester rolls; Figure 8 being the upper portion and Figure 9 the lower portion thereof, with the two figures matching on the lines A—A and B—B. Figure 8 is taken substantially on the plane of the line 8—8 of Figure 4, and Figure 9 is taken substantially on the plane of line 9—9 of Figure 5.

Figures 10 and 11 comprise a bottom plan view of the harvester frame; Figure 10 showing the upper portion and Figure 11 the lower portion thereof, with the figures matching on the lines A—A and B—B.

Figure 12 is an enlarged fragmental plan sectional view taken substantially on the plane of the lines 12—12 of Figures 8 and 9.

Figure 13 is an enlarged transverse sectional view through one of the frames at the main drive shaft, and is taken substantially on the plane of the line 13—13 of Figures 2, 4, 6, 8, and 10.

Figure 14 is a transverse sectional view through one of the harvester units taken substantially on the plane of the line 14—14 of Figures 2, 5, 7, 9, and 11.

Figure 15 is a transverse sectional view similar to Figure 14 but taken substantially on the plane of the line 15—15 of Figures 2, 5, 7, 9, and 11.

Figure 16 is a transverse sectional view through the forward end of the frames, the view being taken substantially on the plane of the line 16—16 of Figure 5.

Figure 17 is a fragmental detail sectional view through a portion of one of the husking rolls, taken substantially on the plane of the line 17—17 of Figure 12.

Figures 18, 19, and 20 are detail sectional views of one of the husking rolls taken on the lines 18—18, 19—19, and 20—20 respectively of Figure 17.

The machine includes a pair of substantially identical harvesting units including separate side frames 10 mounted in inclined position on the opposite sides of a conventional tractor 11 so that the upper ends of the frames are located on either side of the machine between the driver's seat 12 and the driving wheels 13 of the tractor. To this end the tractor is provided with suitable mounting brackets 14 which may be secured to the rear axle 15 of the tractor. As shown, each of the brackets 14 includes a forwardly extending arm 16 on which the mounting yoke 17 of one of the harvester frames is secured by a bolt 18. The bracket is slotted at 19 to permit adjustment for row width.

The mounting bracket 14 is provided with a gear box 21 driven from the power take-off shaft 22 of the tractor through a chain 23 and power input shaft 24. The gear box 21 drives a transverse shaft 25 which carries a V-belt pulley 26 at each of its opposite ends. The pulleys 26 are belted to driven pulleys 27 on the main drive shaft 28 of each harvester frame by a pair of belts 29. The drive shafts 28 of each harvester unit are supported at the upper end of the mounting yoke 17 and the shaft in turn supports the harvester frame, to effect a pivoted mounting of each frame near the upper end.

The forward, or lower, end of each of the harvesting units is supported from an auxiliary frame composed of a cross bar 31 extending transversely across the tractor and carried at the upper ends of a pair of vertical frame members 32. The frame members 32 are bolted or otherwise secured to the frame of the tractor and the cross bar 31 is secured at the upper ends by a pair of angle plates 33. The cross bar 31 carries a pair of tension springs 34 at each end, with the upper end of each spring joined by a yoke 35 and adjustably connected to the cross bar 31 by a tie bolt 36. The lower ends of these springs are hooked to the harvester frame, so that the tension of the springs tends to balance the weight of the frames and the entire unit may be manually raised or lowered to adjust the operating height.

The harvesting units are raised or lowered by means of a hand lever 37 carried on a rock shaft 38 extending between bearings 39 at the opposite ends of the cross bar 31. The rock shaft 38 has a crank 41 at each end and each of the cranks 41 is connected to one of the harvesting frames by a tie rod 42 and an eye bolt 43. The hand lever 37 includes a spring dog 44 adapted to engage a notched locking plate 45 and to lock the harvester units at any desired position.

Each of the individual harvester units comprises a frame 10 including a gear box 51 with a pair of angle iron arms 52 bolted thereto by the bolts 54. The arms 52 lie in generally parallel relation and extend angularly downwardly to a position on each side of the front wheels 55 of the tractor. The arms 52 serve as a pair of longitudinally extending side frames in which the harvesting rolls of the machine are mounted. The rolls are arranged in pairs and, in the preferred form of the invention, are formed so that each roll functions both as a snapping roll and a husking roll. The snapping portion of the rolls is adjacent the lower end of the frame and the husking portion near the upper end. For best results, the rolls are formed as articulated units; with a joint between the husking portion of the roll and the snapping section, and bearings arranged to support the two sections in substantial alignment but to permit adjustment at the joint so that the spacing of the rolls may be varied to suit the crop being harvested and the conditions of operation. To this end the upper end of each roll is provided with a stub shaft 56 mounted in a bearing 57 in the gear box 51. Each shaft 56 extends into an internal tube 58 which extends downwardly along the frame to a point adjacent a center bearing 61. The bearing 61 includes a cylindrical portion surrounding a stub shaft 62 which extends into and supports the tube 58, and the bearings 61 are secured to the side frames 52 by bolts 63 extending downwardly through the upper frame of the angle iron into slots 64 in the bearings, so that the position of the bearing may be altered to adjust the spacing between the rolls (Figure 14). The bearings are preferably also provided with adjusting screws 65 threaded in bosses 66 on the angle irons 52 and locked in position by lock nuts 67.

The part of the roll between the gear box 51 and the bearing 61 comprises the husking portion. To this end, it is preferably provided with an irregularly surfaced cast metal husking roll 68 telescoped over the tube 58 and pinned to the tube and stub shaft 56 by a rivet 69. Most satisfactory results are obtained by utilizing two similar but opposite rolls, with one roll extending completely to the bearing 61 and the metal surface of the opposite roll terminating at the point 71; with a rubber surfaced portion 72 extending from the metal roll to the bearing 61. The rubber portion 72 of the roll may be formed by bonding a rubber surface on a metal tube 73 and locking the tube 73 to the inside tube 58 by toothed fittings 74 and 75 at the opposite ends, and a collar 76 having a cylindrical flange extending over one end of the bearing 61 may be pinned to the shaft 62 by the rivet 77 to extend the rotating surface of the roll partially over the bearing.

The lower portion of each roll comprises a snapping section. These sections are preferably formed of tapered metal tubes 81 pinned to the stub shaft 62 by the rivet 82 and extending from the center bearing 61 to an internal bearing pin 83 welded to brackets 84 adjustably secured to the angle iron side frames 52 near their lower ends. Anti-friction bushings 85 are inserted in the lower ends of the tubes to serve as bearings. The stub shaft 62 may be provided with a ball shaped end portion 86 to permit a certain amount of misalignment between the upper and lower portions of the roll, and it is advisable to provide a skirt 87 extending over the lower end of the bearing 61 so that the rotating surface of the upper and lower sections of the rolls are quite close together and give the effect of a continuous surface.

The rolls are driven by a pair of bevel gears 91 pinned to the main drive shaft 28 and in mesh with bevel gears 92 on the inner ends of each of the stub shafts 56. The gears 91 effect a positive drive of the gears 92. It may be noted in passing that this construction permits the use of relatively large and sturdy gears, since although the teeth of the two gears 92 inter-mesh slightly they are timed by their engagement with the gears 91 so that their teeth do not contact each other. The drive shaft 28 is mounted in roller bearings 93 carried by bearing housings 94 comprising a portion of the gear box 51 and each of the bearing housings includes a hub 95 extending through and pivoted in one of the arms of the mounting yoke 17. Thus the hubs 95 act as a pair of trunnions so that the entire unit is pivotally mounted at its upper end. The drive shafts 28 each carry a sprocket 96 at their inner ends and these sprockets drive a pair of chains 97 to rotate a driven sprocket 98 on a counter-shaft 99 which drives the conveyor chains. The counter-shaft 99 is mounted in a bearing bracket 101 adjustably secured to the gear box 51 by a plate 102 having an adjusting screw 103 to alter the relative positions of the shaft 99 and the gear box and thus adjust the chain 97, and a pair of bolts 104 are provided to secure the bracket 101 in position.

The driven sprocket 98 is free on the shaft 99 but includes a bevel toothed hub engaging matching teeth on a fixed collar 105, and a spring 106 serves to hold the teeth in engagement. Thus the sprocket drives the shaft under normal load conditions but may act as an overload release if the conveyor chains should become fouled.

The counter-shaft 99 carries a pair of conveyor chain sprockets 107 over which conveyor chains 108 are passed. The chains 108 extend the full length of the frame and pass over front sprockets 109 mounted on angle brackets 111 adjustably bolted to the forward ends of the angle irons 52. It will be noted from Figures 5 and 16 that the sprockets 109 do not operate in a true vertical plane but are inclined outwardly at the front and inwardly at the top so that the upper spans of the chains 108 are somewhat closer together than the lower spans. The upper spans of each of the chains moves from the lower end of the frame upwardly along chain guides to the upper sprockets 107 so that the conveyor lugs 112 engage the corn stalks coming between the rolls and move them upwardly into the throat of the machine. The angle of inclination of the sprockets 109 permits the lugs 112 on the upper spans of the chains to engage the stalks quite positively, yet the lugs on the lower spans are spaced apart enough to clear the stalks. This novel arrangement of the chains and sprockets also is of advantage in that it permits the construction of individual harvesting units wherein the frames of each unit are considerably narrower than heretofore practicable, since the return span of the chain operates substantially below rather than at the side of the operating span. This is of tremendous practical importance, since it means that the individual harvesting units may be spaced to accommodate even the most closely planted rows, and yet will be sufficiently far apart to give ample room for the front wheels 55 of the tractor to turn normally.

The operating span of the chain 108 is provided with chain guides consisting of a pair of longitudinally extending channels 113 each mounted on a number of slotted adjusting plates 114 secured to the flat top flange of the angle irons 52 by bolts 115. The chains also include side and top guides consisting of the vertical plates 116 mounted on a number of slotted brackets 117 adjustably secured to the angles 52 by bolts 118. The plates 116 have angle irons 119 mounted on their inner faces with wear strips 121 on the lower surface of the angle irons to bear against the top surface of the chain links and hold the chains in position in the channels 113. The wear strips 121 have upwardly curved portions 122 at their forward end to guide the chains under the strips. The channels 113 and side plates 116 are both curved inwardly immediately above the lower sprockets 109, so that the chains 108 are guided in a curved path and brought quite close together as they pass along the lower or snapping portions 81 of the harvesting rolls. The upper portions of the chain guides are adjusted so that the chains gradually diverge as they move upwardly, and reach a point of maximum spacing at the sprockets 107. In operation, this means that the single pair of chains serves a double function and acts first as a pair of gathering chains to bring the stalks of corn into the snapping rolls with a quite positive action, yet later acts as an auxiliary conveyor to prevent the ears from overloading in the husking rolls, but yet exert no positive conveyor action. It follows that the stalks are positively drawn into the rolls and that the upward movement of the lugs 112 as they pass over the sprockets 109 effectively lifts down stalks, yet the individual ears may remain on the husking rolls as long as necessary for a complete removal of the husk. The return, or lower, spans of the chains are carried in sheet metal slides 120 bolted to the angles 52.

The nature of these harvesting units, which require that the stalks of corn pass between the rolls over a large portion of their length, prohibits cross members directly between the angles 52, yet it is important to maintain quite accurate spacing of the rolls to insure the most satisfactory operation, and it is therefore important to provide a satisfactory means of adjusting the relative spacing between the opposite rolls of the pair. This is accomplished in the present disclosure by the provision of an arch formed of a pair of vertical channel irons 123 having bottom flanges 124 bolted to the angles 52 and joined by a cross channel 125 at their upper end. These channels are preferably welded together to form a rigid integral arch, but a tie bolt 126 is placed between the vertical channels 123, and is provided with internal and external adjusting nuts 127 and 128. In use, these adjusting nuts may be selectively tightened to flex the arch inwardly or outwardly sufficiently to move the opposite angles 52 of the frame enough to accomplish the necessary degree of adjustment of spacing between the frames. Any necessary adjustment of the center bearing 61 of the rolls is made by shifting the position of these bearings with respect to the frame.

Each harvester unit is provided with detachable sheet metal shields 131 having mounting strips 132 adapted to slip into sockets 133 in the brackets 117, so that the shields may be easily attached or removed from the frame. Sheet metal snouts 134 are similarly mounted on the outside of each of the harvesting frames and a center snout 135 cooperates with these to direct stalks of corn into the throat of the rolls.

The ears of corn moving upwardly to the top of the harvesting unit drop through the corn shute 136 and into a trough 137 extending to the hopper 138 from which the ears are loaded into a wagon by a conventional elevator 139. The frames of each unit include a rearward extionsion 141, however, terminating in bearing blocks 142 in which a pair of trash rolls 143 and 144 are journaled. The lower roll 144 is driven by a chain 145 extending from a sprocket 146 on the counter-shaft 99 to a driven sprocket 147 on the shaft of the roll. The upper roll 143 is driven by a pair of gears 148 at the opposite ends of the rolls and a trash chute 149 is provided on each of the harvester units to deflect trash such as stalks and husks outwardly onto the ground so that they will not fall into the hopper 138 and be loaded with the grain.

From the foregoing it will be evident that the teachings of the present disclosure accomplish the double functions of gathering the stalks into the snapping rolls and conveying the ears over the husking rolls with a single pair of chains extending substantially the length of the harvesting rolls, with the chains arranged to include a closely spaced gathering portion adjacent the lower end of the rolls, and a more widely spaced conveyor portion adjacent the upper portion of the rolls. These chains mark a direct departure from the prior teachings of the art in several respects. For one thing, they accomplish the functions of gathering the stalks into the snapping rolls and conveying the ears over the husking rolls with a single pair of chains and thus contribute to simplicity. Also, the opposite chains do not move in the same plane as has been the usual practice heretofore, but instead have their upper ends extending over a pair of sprockets mounted on a single horizontal shaft, so that the chains operate in two generally parallel planes on the opposite sides of the rollers. This brings the return spans of each chain below, rather than at the side of, the operating span, so that the entire unit may be very narrow, and it follows that a pair of the units may be mounted on the opposite sides of a tractor to form a two row picker, yet permit normal steering. In addition, the fact that the lower chain sprockets are inclined inwardly at the top brings the upper spans of the chains relatively close together so that the chains exert a positive grip on the stalks and gather them into the bite of the rolls, although the return spans of the chains are spaced apart sufficiently so that they do not strike the stalks. As the chains move upwardly toward the husking portions of the rolls they diverge, however, so that they assist in conveying the ears over the husking portion of the rolls but do not positively move the ears. Thus it is entirely feasible to utilize a single chain to act as a gathering device adjacent the lower portion of the rolls and as a conveyor in the husking portion. This naturally avoids the mechanical complexities heretofore involved in providing separate gathering and conveying chains, adds to simplicity, and aids in the creation of a satisfactory light weight machine.

The invention also makes possible a machine having the snapping and husking rolls interrelated as a single articulated pair; which also contributes to simplicity and light weight yet accomplishes clean picking and satisfactory husking. The mode of adjustment of the rolls is greatly simplified over previously known devices, yet the opposite halves of each side frame are joined by an integral arch that gives great strength and adequate rigidity. The combination of the trash rolls with the husking rolls and chute clear any foreign matter from the units and prevent broken stalks from passing into the corn hopper, and assist in the general aim of providing a machine that is at once light, simple, easy to attach to and detach from a tractor, yet is capable of clean picking and good husking, and able to stand up under long continued use.

The form of the invention illustrated in the drawings and described herein is the present preferred embodiment of these teachings and is believed to be well suited to the description of the advantages to be gained thereby. It is to be recognized, however, that various deviations from the exact structure shown may be indulged in without departure from the inventive concept or sacrifice of all of the advantages thereof, and it is accordingly pointed out that the scope of the invention extends to any variations or modifications of these teachings coming within the terms of the appended claims.

Having thus described the invention, what I claim as new and desire to protect by United States Letters Patent is:

1. In a corn harvester having at least one harvesting frame adapted to be pivotally mounted at a point adjacent the rear portion of a tractor and to extend angularly downwardly to a point on one side of the front wheel of the tractor the combination of a single pair of harvesting rolls extending longitudinally of the frame and rotatably mounted thereon, each of said harvesting rolls including an upper bearing, a lower bearing, an articulated joint between the upper and lower bearings, and a shiftable center bearing at the articulated joint to adjust the distance between the surfaces of the rolls; together with a pair of conveyor chains extending between a pair of upper sprockets adjacent the upper end of the harvesting rolls and a pair of lower sprockets adjacent the lower end of the rolls, the upper sprockets being coaxial with each other and rotating on a horizontal axis so that each chain lies in a vertical plane at its upper end, the lower sprockets being inclined inwardly at their upper sides so that the upper spans of the chains are closer together than the lower spans; together with curved chain guides extending inwardly toward each other from the lower sprockets and gradually diverging along the frame to a point of maximum spacing adjacent the upper sprockets.

2. In a corn harvester having at least one harvesting frame adapted to be pivotally mounted at a point adjacent the rear portion of a tractor and to extend angularly downwardly to a point on one side of the front wheel of the tractor, the combination of a single pair of harvesting rolls extending longitudinally of the frame and rotatably mounted thereon, each of said harvesting rolls including an upper bearing, a lower bearing, an articulated joint in the rolls between the upper and lower bearings, and a center bearing at the articulated joint; together with a pair of conveyor chains extending between a pair of upper sprockets adjacent the lower end of the rolls, the upper sprockets being coaxial with each other and rotating on a horizontal axis so that each chain lies in a vertical plane at its upper end, the lower sprockets being inclined inwardly at their upper sides so that the upper spans of the chains are closer together than the lower spans.

3. In a corn harvester having at least one harvesting frame adapted to be pivotally mounted at a point adjacent the rear portion of a tractor and to extend angularly downwardly to a point on one side of the front wheel of the tractor, the combination of a single pair of harvesting rolls extending longitudinally of the frame and rotatably mounted thereon, together with a pair of conveyor chains extending between a pair of upper sprockets adjacent the upper end of the harvesting rolls and a pair of lower sprockets adjacent the lower end of the rolls, the upper sprockets being coaxial with each other and rotating on a horizontal axis so that each chain lies in a vertical plane at its upper end, the lower sprockets being inclined inwardly at their upper sides so that the upper spans of the pair of chains are closer together than the lower spans.

4. In a corn harvester having at least one harvesting frame, the combination of a plurality of inclined harvesting rolls rotatably mounted on the frame, together with a pair of conveyor chains extending between a pair of upper sprockets and a pair of lower sprockets, the upper sprockets being coaxial with each other and rotating on a horizontal axis so that each chain lies in a vertical plane at its upper end; the lower sprockets being inclined inwardly at their upper sides so that the upper spans of the pair of chains are closer together than the lower spans; together with curved chain guides extending inwardly toward each other from the lower sprockets and gradually diverging along the frame to a point of maximum spacing adjacent the upper sprockets.

5. In a corn harvester including a frame, a pair of inclined harvesting rolls, and a pair of gathering chains for the rolls, the improvement that resides in the provision of a pair of chain sprockets adjacent the lower ends of the rolls and mounted at a slant with their upper portions closer together than the lower portions, to position the operating spans of the chains above and closer together than the return spans.

6. In a corn harvester including a frame, a pair of inclined harvesting rolls, and a pair of gathering chains for the rolls, the improvement that resides in the provision of a pair of vertical chain sprockets supporting the upper end of the chain and a second pair of chain sprockets adjacent the lower ends of the rolls and mounted with their axes at an obtuse angle to each other, to position the operating spans of the chains above and closer together than the return spans.

7. In a corn harvester including a frame, a pair of inclined harvesting rolls, and at least one gathering chain for the rolls, the improvement that resides in the provision of opposite chain sprockets adjacent the upper and lower ends of the rolls with the upper sprockets in vertical parallel relationship and the chains extending therefrom to the lower sprockets with the axes of the opposite lower sprockets in non-parallel relation, so that the operating span of the chain moves in a different plane than the return span and is adapted to engage stalks entering the rolls although the return span of the chain clears the stalks.

HENRY J. KUHLMAN.

REFERENCES CITED

The following references are of record in the file of this patent:

UNITED STATES PATENTS

| Number | Name | Date |
|---|---|---|
| 238,051 | Randall et al. | Feb. 22, 1881 |
| 311,056 | Avery | Jan. 20, 1885 |
| 332,411 | Lee | Dec. 15, 1885 |
| 397,998 | Osborn | Feb. 19, 1889 |
| 435,238 | McCollister et al. | Aug. 26, 1890 |
| 841,704 | Moore | Jan. 22, 1907 |
| 899,142 | Stone | Sept. 22, 1908 |
| 915,912 | Wandscheer | Mar. 23, 1909 |
| 1,247,070 | Benjamin | Nov. 20, 1917 |
| 1,734,972 | Johnson | Nov. 12, 1929 |
| 1,910,189 | Synck | May 23, 1933 |
| 1,964,579 | Hyman | June 26, 1934 |
| 2,223,704 | Powell | Dec. 3, 1940 |
| 2,308,102 | Paradise et al. | Jan. 12, 1943 |
| 2,334,945 | Mitchell | Nov. 23, 1943 |
| 2,349,328 | Aasland | May 23, 1944 |